Dec. 9, 1969  J. L. COULTER  3,482,595
FLUID FLOW CONTROL VALVE
Filed Aug. 4, 1967
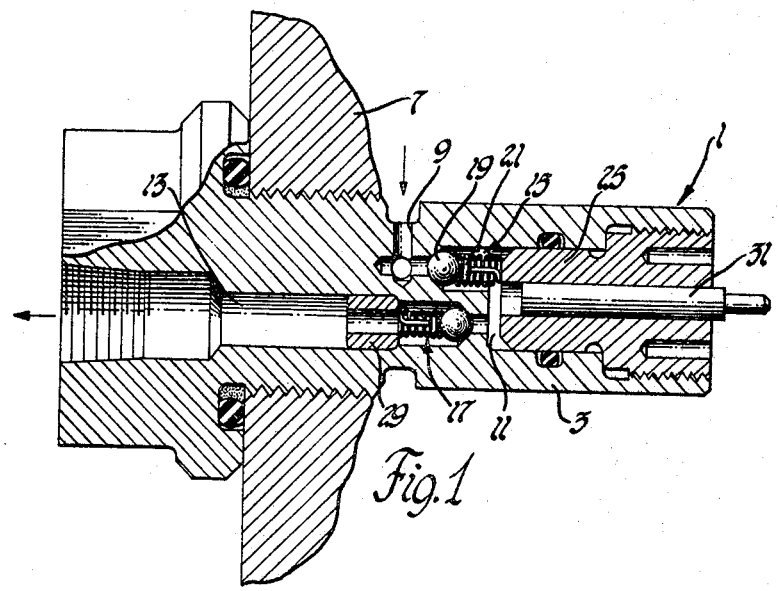
Fig. 1
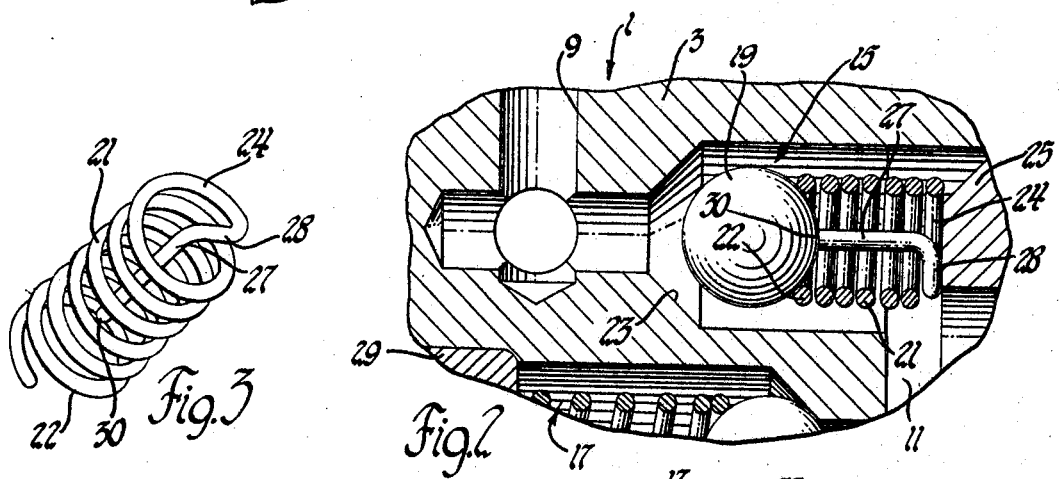
Fig. 3
Fig. 2
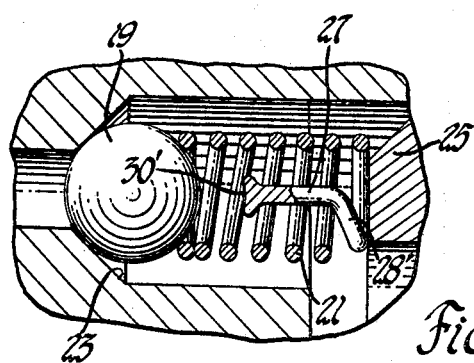
Fig. 4
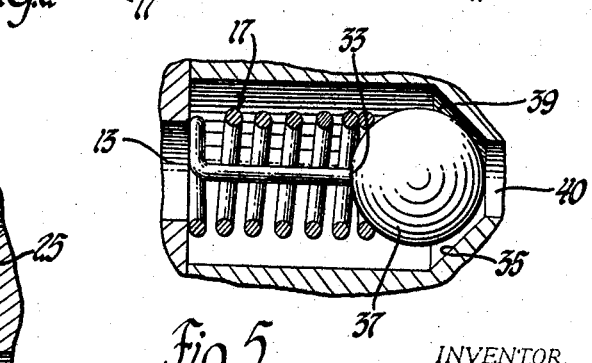
Fig. 5
INVENTOR.
James Lee Coulter
BY
Charles R. White
ATTORNEY United States Patent Office
3,482,595
Patented Dec. 9, 1969

3,482,595
FLUID FLOW CONTROL VALVE
James Lee Coulter, Fraser, Mich., assignor to General Motors Corporation, Detroit, Mich., a corporation of Delaware
Filed Aug. 4, 1967, Ser. No. 658,477
Int. Cl. F16k 15/04, 21/04
U.S. Cl. 137—539                     10 Claims

ABSTRACT OF THE DISCLOSURE

A hydraulic pump having check valves for the intake and discharge ports to permit hydraulic fluid to enter the pump only through the intake port on pump intake stroke and to leave the pump only through the discharge port on pump discharge stroke. Each check valve includes a valve element loaded against a valve seat by a coil return spring which has an operating end coil engaging the valve element and an opposite end coil engaging a spring seat. An integral extension or continuation of the seated end coil extends longitudinally within the coil for a limited distance to provide a limit stop to limit valve member movement to limit spring deflection for high speed valve operation.

---

This invention pertains to fluid flow control valves and more particularly to valve spring construction for yieldably holding a movable valve element against a valve seat and incorporating an integral limit stop for limiting valve element travel to control the extent of spring deflection and to provide for high speed valve operation.

In the control of fluids, it is desirable for highly efficient operation to employ control valves which operate at high speed to insure that the flow of fluid takes place in a fluid conduit in only one direction. A preferred embodiment of this invention is drawn to a high speed check valve and includes a valve member biased by a coil spring into a valve seat. When the force exerted by the fluid is directed to move the ball off of its seat against the bias of the spring, the fluid can flow in one direction in a conduit. This invention provides construction integral with the spring to limit spring deflection and the distance which the valve member can be displaced from its seat. By controlling the displacement of the valve member, the valve member can operate at a higher frequency by quickly moving into blocking engagement when the fluid force on the valve member is directed toward the valve seat.

It is an object of this invention to provide an improved high speed valve for control of fluid flow including a spring for biasing a valve member into engagement with a valve seat and having integral construction for limiting the movement of valve member travel from its seat and the degree of spring deflection.

Another object of this invention is to provide in a hydraulic fluid control valve having a valve member normally biased by a coil spring into a valve seat to block fluid flow in one direction but allowing fluid flow in an opposite direction, a stop mechanism integral with the spring for limiting the distance which the valve member can be moved from its seat thereby permitting the valve to operate at a high speed.

Another object of this invention is to provide an improved fluid flow control device having a valve member biased by a yieldable member into engagement with a seat to block fluid flow and including a mechanism for limiting movement of the valve member from its seat to meter the flow of fluid therethrough.

In the drawing FIG. 1 is a cross sectional view of a pump assembly.

FIGURE 2 is an enlarged portion of FIG. 1.

FIGURE 3 is a perspective view of the coil spring of FIGS. 1 and 2.

FIGURE 4 is a cross sectional view similar to the view of FIG. 2 showing another embodiment of the invention.

FIG. 5 is a cross sectional view of another embodiment of the invention.

As shown in FIG. 1 there is a pump 1 having a main body 3 which is threaded into support 7. The body has a hydraulic fluid intake passage 9 which is connected by an inner chamber 11 to a discharge passage 13. Ball check valves 15 and 17 are provided in the body for the intake and discharge passages respectively in ensure that hydraulic fluid flows only into the pump through passage 9 and out of the pump through passage 13. Valve 15 includes a spherical ball 19 of steel, nylon or other suitable material retained in chamber 11 by a helical coil spring 21 of an elastic material such as oil-tempered steel or music wire. The ball is seated on an operating end coil 22 of the spring and is normally biased by the spring into engagement with a tapered valve seat 23 in body portion 3 to block flow of fluid from chamber 11 to the intake passage 9. The seated end coil 24 of the spring is seated on a support such as the end of a piston guide 25 threaded in body 3. The spring also has an integral limit stop or extension 27 which is coaxial with the longitudinal axis of spring 21. As shown best by FIGS. 2 and 3, the limit stop is connected to the seated coil 24 by radial portion 28 and extends to a point within the coils of the spring. The seat or end 30 of the limit stop provides a ball contact to limit the extent of ball travel when moved from its seat by the force exerted by fluid under pressure supplied to intake passage 9. By decreasing the distance of ball travel, the time or period required for each operating cycle is reduced.

Ball check valve 17 is similar to valve 15 in construction but has its spring mounted on a cylindrical, fluid-conducting seat 29 pressed or otherwise secured in the discharge passage 13. As shown, the ball of this valve is biased by the associated spring onto its seat and operated to block fluid flow from the discharge passage into chamber 11.

A pump piston 31 is mounted for reciprocal movement in the piston guide 25. Any suitable actuator means may be employed for piston reciprocation. On the pump intake stroke the piston will be moved to the right, and fluid entering the intake passage 9 will move ball 19 off of its ball seat against the opposing force of spring 21 into engagement with the end of extension 27 of spring 21 where further ball travel will be prevented.

FIGURE 2 shows the ball engaging the end of extension 27 and without fully compressing the spring 21. The spring 21 is retained in this position by the force of the fluid exerted on ball 19 as it enters into the pump. At this time the ball of check valve 17 is seated to block passage of fluid from discharge passage 13 to chamber 11. On the pump discharge stroke, the piston moves inwardly in the body 3, and the ball 19 of check valve 15 responds to the bias of spring 21 and the force transmitted by the fluid in chamber 11 by rapidly traveling from the limit position established by extension 27 onto its seat 23 to block flow of fluid from chamber 11 to passage 9.

The force applied to piston 31 is also transmitted by the fluid in chamber 11 to the ball of check valve 17 which moves off of its seat into engagement with the extension of its spring and allows the fluid to pass from chamber 11 to discharge passage 13. When the piston moves rearwardly on its intake stroke, the spring of the check valve 17 again seats the ball to prevent passage of fluid from discharge passage 13 to chamber 11 while the check valve 15 operates as initially described to allow passage of fluid from the intake passage 9 to chamber 11.

The provision of a limit stop to set the distance traveled by the ball after the spring setting has been exceeded permits the valve to function at a high frequency. This reduces loss of fluid from the valve as the valve element or ball is being seated thereby providing more efficient fluid control. Also by limiting the amount of spring deflection, the fatigue life of the spring is increased making it more useful in severe service conditions.

The control valve of this invention can be readily tailored to meet different requirements by changing the fixed dimensions of the spring and limit stop. For example, greater ball travel and reduced operating frequency can be obtained by merely reducing the length of the limit stop. Impact of the ball with the limit stop can be damped or cushioned by inclining the radial portion relative to the spring seat (FIG. 4) so that the limit stop will provide some spring action to damp vibration and reduce wear. If the impact force of ball 19 is greater than the setting of the inclined spring portion 28', that portion will deflect until it grounds on the spring seat. The end 30' of the extension or limit stop 27 can be upset or otherwise made to provide a larger stop surface contacting and fitting the valve element surface; such as, a spherical surface contacting the ball valve element 19 to reduce wear between the limit stop and valve element.

The provision of the spring and ball travel stop as a unitary construction is advantageous in assembly and disassembly since the stop is automatically installed and removed with the spring. This reduces cost of repair since only one piece has to be handled and the stop is accurately positioned when the spring is seated.

This invention can be utilized to control the rate of fluid flow through a fluid conducting passage. If it is desired to meter the output of the pump of FIG. 1, the limit stop or extension of the spring of valve 17 is terminated in an end portion 33 spaced from the valve seat 35 by a distance slightly greater than the diameter of ball 37 as shown in FIG. 5. The limit stop accordingly restricts the movement of the ball on pump discharge stroke to the space closely adjacent to the valve seat. The flow passage 39 around the ball is smaller than the orifice 40 leading into the valve seat. This restriction meters or calibrates the flow through the orifice from chamber 11 to passage 13.

Such restricted orifices are also useful in hydraulic control circuits for automatic transmissions to provide for the smooth transition from one gear ratio to another. If orifice 40 were connected to a piston apply chamber for a direct drive clutch and passage 13 were connected to a release chamber of a servo controlling a reduction ratio brake band, pressure fluid supplied to the direct drive apply chamber through a separate passage would cause the high clutch to engage. At the same time the reduced flow through the metered orifice 40 causes the delayed disengagement of the low brake band to effect a desired overlap shift.

This invention is not limited to the details of the construction shown and described for purposes of illustrating the invention for other modifications will occur to those skilled in the art.

I claim:
1. In a valve for controlling the flow of fluid in a body member having a fluid conducting passage, a valve seat on said body member in said passage, a valve member movable into engagement with said valve seat in response to a force exerted on said valve member directed toward said valve seat to block fluid flow in a first direction in said passage, said valve member being movable away from said valve seat in response to a predetermined force exerted on said valve member directed away from said valve seat to allow fluid flow in a second direction in said passage, coil spring means operatively connected to said body member and said valve member and operative to exert a force on said valve member directed toward said valve seat, and limit means integral with said spring means and extending within the coils of said spring means for contacting and limiting the movement of said valve member away from said valve seat and said limit means having a seat spaced from said valve member when said valve member is engaging said valve seat for directly engaging and limiting the travel of said valve member from said valve seat.

2. The valve defined in claim 1, wherein said limit means extends longitudinally toward said valve member and is operative to limit the deflection of said spring means by limiting valve member movement before said spring means can be fully deflected.

3. In a valve for controlling the flow of fluid in a body member having a fluid conducting passage, a valve seat on said body member in said passage, a valve member movable into engagement with said valve seat in response to a force exerted on said valve member directed toward said valve seat to block fluid flow in a first direction in said passage, said valve member being movable away from said valve seat in response to a predetermined force exerted on said valve member directed away from said valve seat to allow fluid flow in a second direction in said passage, coil spring means operatively connected to said body member and said valve member and operative to exert a force on said valve member directed toward said valve seat, limit means integral with said spring means spaced from said valve member when said valve member is engaging said valve seat for limiting the travel of said valve member from said valve seat, seat means for said spring means engaging an end coil thereof, and said limit means being an extension of said last mentioned coil and extending longitudinally within the coils of said coil spring means toward said valve member.

4. In a check valve, a body having a valve chamber therein, a fluid passage communicating with said chamber, a valve seat in said body between said passage and chamber, a valve member for engaging said valve seat to prevent the flow of fluid from said chamber into said passage and displaceable from said seat to allow the flow of fluid from said passage into said chamber, a coil spring operatively disposed in said chamber having one end engaging said valve member for exerting a force in said valve member and biasing said valve member into engagement with said valve seat, said spring including an extension internal of the coils thereof to directly contact and limit the amount of movement of said valve member from said valve seat in response to a fluid force opposed to and greater than the force of said spring to permit said valve member to operate at a high frequency when said last mentioned fluid force is overcome by an opposing higher force which includes spring force.

5. In a check valve, a body having a valve chamber therein, a fluid passage communicating with said chamber, a valve seat in said body between said passage and chamber, a spherical valve member for engaging said valve seat to prevent the flow of fluid from said chamber into said passage and displaceable from said seat to allow the flow of fluid from said passage into said chamber, a coil spring operatively disposed in said chamber having one end engaging said valve member for exerting a force on said valve member and biasing said valve member into engagement with said valve seat, said spring including an extension internal of the coils thereof to limit the amount of movement of said valve member from said valve seat in response to a fluid force opposed to and greater than the force of said spring to permit said valve member to operate at a high frequency when said last mentioned fluid force is overcome by an opposing higher force which includes the force of said spring, and said extension for limiting the extent of displacement of said valve member being coaxial with the longitudinal axis of said spring and terminating in a seat portion within the coils and spaced from said valve seat to seat said valve member when displaced from said valve seat.

6. In a fluid control valve, a body for containing a fluid having an opening therein to provide a fluid passage therethrough, a valve seat adjacent to the opening in said body, a valve member engageable with said seat to block the flow of fluid from said body through the opening therein and disengageable from said valve seat to permit fluid to flow from said body through the opening therein, spring means engageable with said valve member and supported on said body for exerting a force thereon biasing said valve member into engagement with said valve seat, and travel limiting means integral with said spring means and longitudinally extending in said spring means toward said valve seat for limiting the travel of said valve member from said valve seat in response to a force on said valve member exerted by the fluid in said body which is greater than the opposing force of said spring means.

7. In a fluid control valve, a body for containing a fluid having an opening therein to provide a fluid passage therethrough, a valve seat adjacent to the opening in said body, a valve member engageable with said seat to block the flow of fluid from said body through the opening therein and disengageable from said valve seat to permit fluid to flow from said body through the opening therein, spring means engageable with said valve member and supported on said body for exerting a force thereon biasing said valve member into engagement with said valve seat, and means integral with said spring means for limiting the travel of said valve member from said valve seat in response to a force on said valve member exerted by the fluid in said body which is greater than the opposing force of said spring, said spring means being a continuous wire coil spring having an operating end coil engaging the valve member and a ground end coil supported on said body, and said means integral with said spring means for limiting valve member travel being an integral continuation of the wire coil spring having an inwardly extending radial portion extending from one of the end coils and a continuous connected portion of the same material as said spring extending longitudinally with the coils and terminating between the end coils providing a limit stop.

8. The control valve of claim 7 wherein said radial portion is inclined and spaced from said body.

9. The control valve of claim 7 and said connected portion terminating between the end coils in a stop surface fitting the engaging surface of said valve member.

10. In a fluid flow control device, a fluid conducting passage, a valve seat disposed in said passage having a fluid conducting opening therein, a valve member, coil spring means having a ground end portion and having an operating end portion operatively connected to said valve member for biasing said valve member into engagement with said valve seat to block the flow of fluid through said opening, a limit stop integral with said spring means and having a seat portion dipsosed between the end portions to limit the movement of said valve member from said seat in response to the force of fluid on said valve member of a magnitude sufficient to overcome the opposing force of said spring means, and said displaced valve member and said seat cooperating to form a restricted fluid flow passage around said valve member to meter the flow of fluid in one direction in said passage.

References Cited

UNITED STATES PATENTS

| 2,400,817 | 5/1946 | Fox et al. | 137—539 X |
| 3,335,750 | 8/1967 | Kepner | 137—515.5 |
| 3,343,564 | 9/1967 | Peeples et al. | 137—543.17 X |
| 3,346,009 | 10/1967 | Lindeboom | 137—543.17 |

FOREIGN PATENTS

| 281,606 | 5/1928 | Great Britain. |

WILLIAM F. O'DEA, Primary Examiner

DAVID J. ZOBKIW, Assistant Examiner

U.S. Cl. X.R.

137—543.17